Patented Apr. 21, 1942

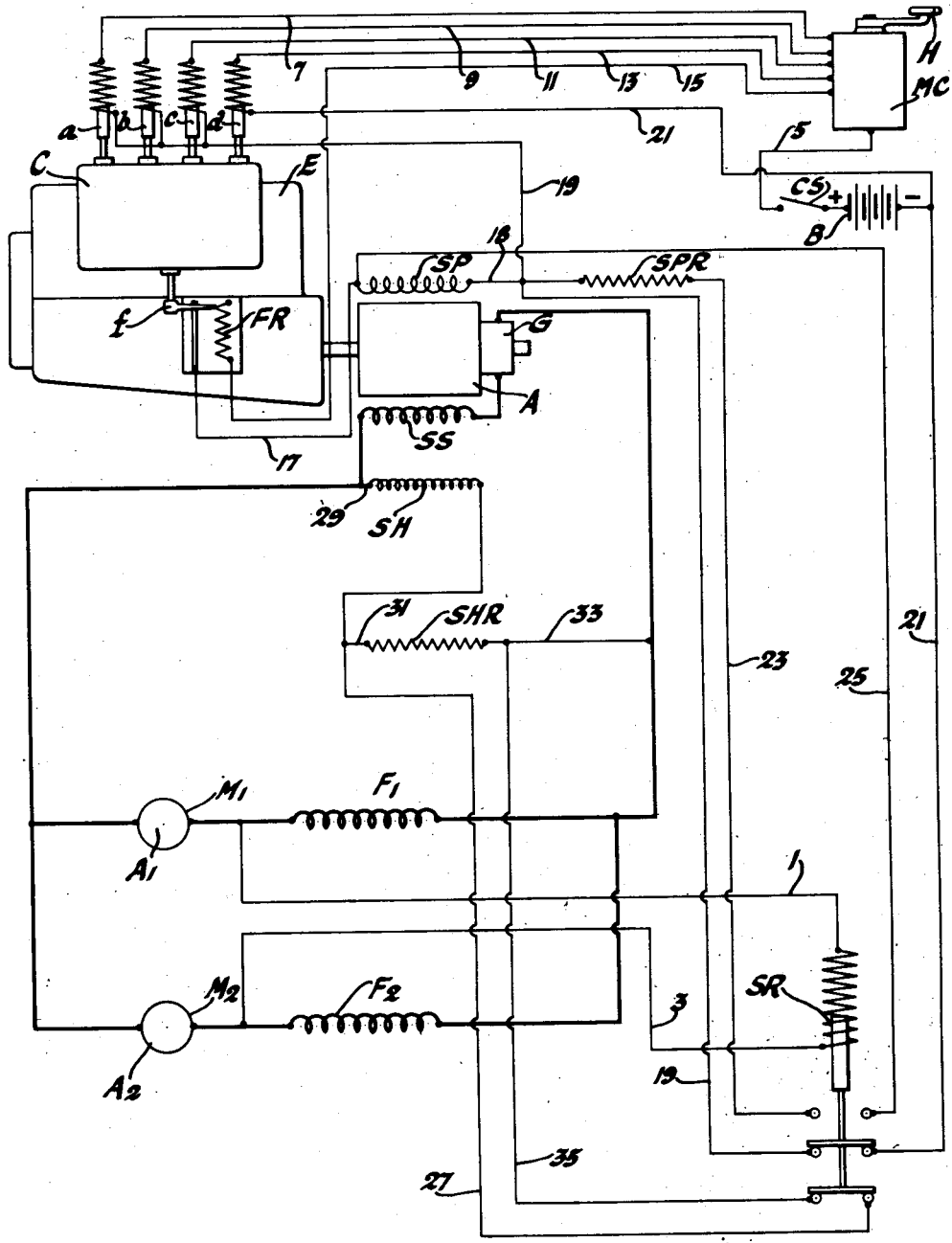

2,280,378

UNITED STATES PATENT OFFICE 2,280,378

GENERATING ELECTRIC DRIVE AND CONTROL SYSTEM

Stuart H. Cowin, Chicago, Ill., assignor to General Motors Corporation, Detroit, Mich., a corporation of Delaware Application May 31, 1941, Serial No. 395,985

6 Claims. (Cl. 290—17)

The present invention relates generally to generating electric drive and control systems and more particularly to a control means which acts automatically to prevent overspeeding of the driving means.

The invention is particularly adapted to generating electric drive systems which include driving motors connected in parallel to a generator driven by a prime mover where each driving motor is operatively connected to individual driving means such as the axles of vehicles having traction wheels fixed thereon or propeller shafts of ships. With driving means of this type it is necessary to provide control means which act instantly upon any tendency of one driving motor to operate at slightly higher speed than another motor and reduce the power supplied to the motors to prevent overspeeding and damage to the motors, means driven thereby, and power plant supplying power to the motors.

The conventional differential relay control means having two voltage coils adapted to be connected across individual armatures of motors connected in series are very sensitive to differences in the back voltage generated by the motors upon overspeeding of one motor armature, but this type of control means is rendered inoperative when the motors are connected in parallel, as then both the voltage applied and the back voltage generated by the individual motors are equal. It will be evident, therefore, that control means of another type must be provided to provide protection against damage to the motors, the individual means driven thereby and the generating electric power plant supplying power thereto where the motors are connected in parallel relation with the generator of the power plant.

The object of the present invention, therefore, is the provision of a very simple electrical control means connected directly between parallel connected driving motors in such a manner that it acts instantaneously upon differences in electrical characteristics of the motors caused by slight differences in speed of the motors to cause a reduction in the speed and power output of a prime mover generator power plant supplying power to the motors to prevent overspeeding of the motors and therefore the means driven thereby to effectively protect the driving means, the motors and also the power plant against damage.

The means by which the above object is accomplished is illustrated in the single accompanying schematic drawing as applied to a generating electric drive and control system for a locomotive and is described in detail in the following specification.

Referring now to the drawing: The generating electric driving system includes a pair of series type traction motors M1 and M2 connected in parallel by power conductors, shown in heavy lines on the drawing, to a generator G, the armature A of which is directly connected to and driven by a Diesel engine prime mover E.

The motor field windings F1 and F2 are connected in series with the armature windings A1 and A2 and the armatures of these motors may be operatively connected in any well known manner to drive individual driving axles of the locomotive, not shown, having driving wheels fixed thereon so that the motors may operate normally at equal speeds in conventional manner.

The prime mover generator power plant is provided with electrically actuated regulating means shown generally at C, such as a conventional engine driven governor having speed setting means. The governor sleeve, not shown, may be connected in conventional manner to operate the conventional engine fuel regulating device, not shown, to vary the speed and torque of the engine and may also be operatively connected in any well known manner to operate a movable element $f$ of a field rheostat FR included in the generator excitation system, to be described, whereby the generator excitation is varied by the governor to vary the generator output and therefore the load on the engine. The governor speed setting means may be connected in any well known manner both to the movable element $f$ of the field rheostat and to electrical means $a$, $b$, $c$ and $d$, each of these means including a plunger and an electromagnetic actuating winding, the plungers being suitably linked to the governor setting means so that upon energization of the winding of the means $d$ the governor setting will be moved so that the engine will be caused to operate at idling speed and no load, and upon energization of the windings $a$, $b$ and $c$ in various combinations with the winding $d$ the plungers of the means $a$, $b$ and $c$ will move the governor setting so that the engine and generator may be caused to operate at any one of a number of constant values of speed, load and output desired in a well known manner.

The generator excitation system includes a series field winding SS connected in series between the generator armature A and motors in conventional manner and also shunt and separately excited excitation circuits. The shunt excitation circuit includes a shunt field winding SH and a discharge resistor SHR. The separately excited excitation circuit includes the above mentioned field rheostat FR, a field winding SP, and a discharge resistor SPR adapted to be connected to a battery B. The connections between the various elements of the shunt and separately excited excitation circuits will be described later in describing the control means which acts at times to connect the discharge resistors in the excitation circuits to cause the excitation current to be reduced to a value whereby the generator voltage and current output to the motors are reduced to a negligible value. The control means, to be described, normally prevents flow of current through these resistors so that normal inherent output regulation of the generator is accomplished by the combined excitation from the series, shunt and separately excited windings and the variation in the excitation and output of the generator is accomplished by adjustment of the movable element $f$ of the field rheostat FR by the governor sleeve.

The control means for the engine generator power plant regulating means includes a manually operable master controller MC and electrical control means comprising a relay SR operable in response to slight differences in speed of the motors M1 and M2.

The master controller MC is of conventional type having stationary contacts and movable contacts, not shown, the movable contacts being movable by a controller handle H into contact with the stationary contacts in different combinations and sequence to control energization of the windings of the electromagnetic means $a$, $b$, $c$ and $d$ in the proper sequence and combination, whereby the engine generator power plant will operate at idle speed and no load or any value of speed, load and output desired, depending upon the particular speed setting of the governor.

The electrical control means or relay SR comprises three pairs of fixed contacts, an armature having contacts fixed thereto and an actuating winding which, when energized, attracts and moves the armature upward from a normal or inoperative position, as shown, in which the two lower pairs of fixed contacts are bridged by the armature contacts, to an operative position where only the central pair of fixed contacts are bridged by the upper armature contact. The winding of the relay is connected directly between the two motors by conductors 1 and 3. Conductor 1 is connected between one terminal of the relay winding and the power conductor interconnecting the armature A1 and the series field winding F1 of the motor M1, and the conductor 3 is connected between the other relay winding terminal and the power conductor interconnecting the armature A2 and series field winding F2 of the motor M2. With the motors connected in parallel with the generator, and with the relay winding directly connected between the motors as described, the generator current will divide equally between the motors as the voltage applied to each is the same, and therefore the driving torque and speed of each motor will be equal if no slippage occurs between the wheels driven by the respective motors and the rail. Normal operation of the motors at equal speeds causes the back voltage generated by each motor armature, that is, the c. e. m. f. across each armature, to be equal in value and there will accordingly be no difference in potential across the terminals of the relay winding and therefore no current will circulate between the motors through the relay winding as long as the motors operate at equal speeds. The relay winding therefore acts as an equalizing connection between the motors, which allows current to circulate between the motors through this connection only upon a slight difference in back voltage or c. e. m. f. between the motor armatures due to a slight difference in speed resulting from any slippage of the wheels driven by either motor with respect to the rail. It will be evident that when the relay winding is energized by current circulating between the motors the relay armature will be attracted and moved to the operative position in which the upper pair of fixed relay contacts are bridged by the upper armature contact and the two lower pairs of fixed contacts are opened.

The control connections, shown in lighter lines on the drawing, between the battery B, master controller MC, electrical control means or relay SR and the electromagnetic means $a$, $b$, $c$ and $d$, and also the generator excitation system, will now be described in detail.

The positive terminal of the battery B is shown directly connected to one terminal of a control switch CS, the other terminal of which is connected by a conductor 5 to the movable contacts of the master controller MC in any well known manner. Control conductors 7, 9, 11, 13 and 15 are connected to individual stationary contacts of the controller. Control conductors 7, 9, 11 and 13 are also connected respectively to the upper terminals of the windings of the electromagnetic means $a$, $b$, $c$ and $d$, and conductor 15 is also connected to one terminal of the field rheostat FR. The other terminal of the rheostat is connected by a conductor 17 to one terminal of the separately excited winding SP, the other terminal of which is connected by a conductor 18 to one terminal of the discharge resistor SPR. A conductor 19 is connected to the conductor 18 and is also connected to each of the lower terminals of the windings of the electromagnetic means $a$, $b$ and $c$ and to the left central fixed contact of the relay SR. The right central fixed relay contact is connected by a conductor 21 to the negative battery terminal and the conductor 21 is also connected to the lower terminal of the winding of the electromagnetic means $d$. It will be evident with the above described connections that with the central pair of relay contacts bridged, one side of each of the windings of the electromagnetic means $a$, $b$ and $c$ and also one side of the separately excited excitation circuit will be connected to the negative battery terminal through these bridged contacts and conductors 19 and 21, and that one side of the winding of the electromagnetic means $d$ is permanently connected to the negative battery terminal by the conductor 21.

With this connection arrangement, therefore, normal energization of the separately excited generator field circuit and also the windings of the electromagnetic means $a$, $b$ and $c$ in various combinations with the winding of means $d$ from the battery may be accomplished through the control conductors 7, 9, 11, 13 and 15, controller contacts, conductor 5 and control switch CS, when closed, to connect both the separately excited circuit and the windings of the electromagnetic means $a$, $b$, $c$ and $d$ in various combinations with the positive battery terminal so that the governor speed setting means actuated by the electromagnetic means will cause operation of the engine generator power plant at any desired value of speed, load and output by movement of the controller handle H to any desired position, as long as the central relay contacts are bridged to complete the return circuit comprising conductors 19 and 21. It will also be evident that with this connection arrangement, operation of the relay causes the central relay contacts to be opened and the separately excited field winding and any or all of the windings $a$, $b$ and $c$ will therefore be automatically disconnected from the negative battery terminal to cause a reduction in the generator voltage and current output, as only the winding of the electromagnetic means $d$ will then remain energized, causing the engine speed to be reduced to a low or idle value.

The connections between the generator excitation circuits and the upper and lower pairs of fixed relay contacts will now be described. Upon operation of the relay the discharge resistors SPR and SHR are automatically connected in the excitation circuits to cause a further reduction in the generator excitation such that the voltage of the generator is reduced to a negligible value and the induced voltage in the separately excited field and shunt field circuits is prevented from reaching a dangerous value upon opening of the separately excited field circuit, as described above.

The left upper fixed contact of the relay is connected by a conductor 23 to one terminal of the discharge resistor SPR which, as has been previously described, has its opposite terminal connected by the conductor 18 to the separately excited field winding SP. The right upper relay contact is connected by a conductor 25 to the conductor 17 interconnecting one terminal of the rheostat FR with one terminal of the separately excited winding, and the other rheostat terminal, as previously described, is connected to conductor 18. With the above described connection arrangement, when the upper fixed relay contacts are open as shown, the discharge resistor SPR is in open circuit relation with the separately excited field winding SP and the current therein is accordingly limited only by the resistance of the field rheostat FR which, as has been described, is controlled by the movement of the movable element $f$ operated by the governor. When the relay operates, however, the upper fixed relay contacts are bridged, which connects the discharge resistor SPR across the field winding SP through these bridged contacts and conductors 23 and 25 to prevent the induced voltage in this winding from reaching a dangerous value, as operation of the relay, as has been described, also causes the separately excited winding to be disconnected from the battery B when the central relay contacts are simultaneously opend.

The right lower fixed relay contact is connected directly by a conductor 27 to one side of the shunt field winding SH having its opposite terminal connected by a conductor 29 to one side of the power circuit. The discharge resistor SHR is connected by conductors 31 and 33 between the conductor 27 and the other side of the power circuit and therefore in series with the shunt field winding SH directly across the power circuit. The left lower fixed relay contact is connected by a conductor 35 to the conductor 33 so that with the lower relay contacts bridged, as shown, the discharge resistor is normally shunted by these bridged contacts and conductors 27 and 35. When the relay operates to open the lower fixed relay contacts it will be evident that the discharge resistor will be connected directly in series with the shunt field winding SH to cause a further decrease in the generator excitation, and the voltage and current output of the generator will be reduced to a negligible value, as the separately excited winding is then also disconnected from the battery B.

Operation of the relay, therefore, by any circulation of current between the respective motors due to a slight variation in speed therebetween accordingly causes the central and lower pairs of fixed relay contacts to be opened and the upper pair of contacts to be bridged simultaneously.

Opening of the central pair of contacts causes de-energization of the separately excited field circuit to reduce the generator voltage, current and power output to the motors and also causes any one or all of the windings of the electromagnetic means $a$, $b$ and $c$ to be de-energized, which causes the speed of the prime mover to be reduced to a low or idle value. Hence the speed, load and output of the power plant are reduced and the power input to the motors is reduced to check overspeedng of either motor with respect to the other.

Bridging of the upper pair of relay contacts connects the discharge resistor SPR across the separately excited field winding upon its de-energization to prevent excessive rise in the induced voltage in this winding.

Opening of the lower pair of fixed relay contacts inserts the discharge resistor SHR in series with the shunt field winding, which likewise lowers the generator voltage and output and prevents a rise in the induced voltage in this winding.

The relay, due to its arrangement in the power and control circuits, therefore allows normal control of the speed and output regulating means C by operation of the manually operable master controller MC when the motors operate at the same speed in a normal manner, but it acts instantly upon any slight difference in speed between the motors to cause the speed and output of the engine generator power plant to be automatically reduced to prevent overspeeding of either of the motors. The relay remains operative until the speed of the motors is again equal, and therefore provides adequate protection for the motors, axles, wheels, track and power plant.

The driving system illustrated shows only one pair of motors connected to the generator of a power plant. If desired, however, a plurality of pairs of motors may be connected in either a parallel or series parallel relation with a generator. Where more than one pair of motors are connected with the generator, one or more relays may be used to prevent overspeeding of any motor with respect to the others. Where a single relay is used, the winding thereof is connected in parallel relation between each pair of motors which are connected in parallel in the manner illustrated, or the relay may be provided with a winding for each pair of motors, each winding being connected between respective pairs of motors. Where a number of relays are used, that is, one relay for each pair of motors, the respective relay windings are connected between pairs of motors, and each pair of fixed relay contacts are connected in series so that operation of any one relay will cause a reduction in the speed and output of the engine generator power plant and a reduction in the generator voltage upon overspeeding of any motor connected to the generator, to prevent overspeeding of any one motor with respect to the others.

I claim:

1. In a drive and control system of the type described comprising a prime mover generator power plant, output regulating means for the power plant, a pair of traction motors connected in parallel relation with the power plant generator and electrical means for controlling the power plant output regulating means, said electrical means being connected directly between the motors to operate instantly upon being energized by circulation of current between the motors caused by any slight overspeeding of either motor, operation of said electrical control means causing the output of the power plant to be instantly reduced, thereby preventing overspeeding of either motor.

2. In a drive and control system for a vehicle comprising a prime mover generator power plant, means for regulating the speed, load and output of the power plant, a plurality of vehicle driving means, each means including a driving motor, means for connecting pairs of said motors in parallel relation with said generator, electrical control means connected between the motors of each electrically connected pair of motors to act instantly in response to circulation of current between any pair of motors upon overspeeding of either motor of a pair to control said regulating means and cause the speed, load and output of the power plant to be instantly reduced to prevent overspeeding of any one motor with respect to the others, thereby preventing damage to the vehicle driving means, motors and power plant.

3. In a drive and control system for a multiple axle vehicle comprising driving motors operatively connected to drive individual axles, pairs of said motors being permanently connected in parallel, a prime mover generator power plant for supplying power to said motors, speed, load and output regulating means for the power plant, generator excitation varying means for reducing the generator excitation to a value whereby the generator voltage is reduced to a negligible value, electrical control means electrically connected betwen each pair of motors connected in parallel, said electrical means adapted to act instantly only upon circulation of current between any pair of motors so connected upon overspeeding of either motor of a pair to control both said power plant regulating means and said generator excitation varying means and cause a reduction in the speed, load and output of the power plant and also a reduction in the generator voltage to prevent overspeeding of the motors and damage to the motors and power plant, and manually operable means for controlling said power plant regulating means, said manually operable means being interconnected with said electrical control means in such a manner that normal control of said regulating means is accomplished by operation of said manually operable means when the electrical control means is normally inactive.

4. In a drive and control system for a vehicle comprising a prime mover generator power plant, means for regulating the speed, load and output of the power plant, a pair of vehicle traction motors connected in parallel with the generator, individual vehicle driving means driven by each motor, and control means for said power plant regulating means comprising interconnected electrical control means and manually operable control means, said electrical means being connected directly between said motors and instantly operable only upon flow of current between the motors due to a slight overspeeding of one motor with respect to the other to automatically cause a reduction in the speed, load and output of the power plant, thereby preventing overspeeding of the motors and damage to the power plant, motors and means driven thereby, said manually operable control means serving to normally control said power plant regulating means only when said electrical control means is inoperative.

5. In a drive and control system of the type described comprising a prime mover generator power plant, speed, load and output regulating means for the power plant, means responsive to variations in the speed of the power plant for actuating the regulating means, speed and load setting means for said speed responsive means, a multiplicity of driving means each including a driving motor, means for connecting pairs of motors in parallel relation with the generator, control means for said speed and load setting means comprising electrical control means, and manually operable control means interconnected therewith, said electrical control means being electrically connected between the motors of each interconnected pair whereby slight variations in speed between the motors of any pair causes the electrical means to act instantaneously to control said speed and load setting means and cause a reduction in the speed, load and output of the power plant, thereby instantly checking overspeeding of any one motor, said manually operable control means being operable to control said speed and load setting means to cause operation of said power plant at different values of speed and load only when said electrical control means is inactive.

6. In a drive and control system for a locomotive having a multiplicity of driving axles and driving wheels fixed thereon comprising a traction motor for driving each axle, a prime mover generator power plant, means for regulating the speed, load and output of said power plant, means for varying the generator excitation to cause a substantial reduction in the generator voltage, means acting in response to variation in the speed and load of the power plant for controlling the power plant regulating means to cause operation of the power plant at constant speed, load and output, speed and load setting means for said speed responsive means to vary the speed, load and output of the power plant, means for connecting the traction motors in parallel with the generator, an equalizing connection between pairs of motors and including electrical control means for jointly controlling said power plant speed and load setting means and said egnerator excitation regulating means, said electrical control means being instantly operable only upon circulation of current in any equalizing connection between any pair of motors caused by overspeeding of one motor with respect to another of a pair to cause a reduction in the speed, load and output of the power plant and a reduction in the generator voltage to instantly check overspeeding of any motor and a manually operable controller for controlling said speed and load setting means, said controller being interconnected with the electrical control means in such a manner that with the electrical control means inoperative, the speed, load and output of the power plant may be varied by operation of the controller.

STUART H. COWIN.